United States Patent [19]

LaBounty

[11] Patent Number: 4,838,493
[45] Date of Patent: Jun. 13, 1989

[54] CONCRETE CRUSHER

[76] Inventor: Kenneth R. LaBounty, Rte. 1, Box 164B, Two Harbors, Minn. 55616

[21] Appl. No.: 205,422

[22] Filed: Jun. 10, 1988

[51] Int. Cl.⁴ .............................................. B02C 1/06
[52] U.S. Cl. ................................ 241/101.7; 225/103; 225/23; 241/66; 414/734
[58] Field of Search ............................ 225/103, 23 R; 241/101.7, 263–269, 283; 299/14, 15, 69, 70; 414/729, 734, 735

[56] References Cited

U.S. PATENT DOCUMENTS

| | | |
|---|---|---|
| 1,035,096 | 8/1912 | Kraut . |
| 2,632,246 | 3/1953 | Shoffner . |
| 3,325,895 | 6/1967 | Grimoldi et al. . |
| 3,802,731 | 4/1974 | LaBounty . |
| 3,814,152 | 6/1974 | Pallari . |
| 3,885,292 | 5/1975 | Sharp et al. . |
| 3,922,783 | 12/1975 | Hayes . |
| 3,972,097 | 8/1976 | Schakat . |
| 4,017,114 | 4/1977 | LaBounty . |
| 4,055,891 | 11/1977 | Wick . |
| 4,104,792 | 8/1978 | LaBounty . |
| 4,188,721 | 2/1980 | Ramun et al. . |
| 4,196,862 | 4/1980 | Tagawa ..................... 241/101.7 X |
| 4,198,747 | 4/1980 | LaBounty . |
| 4,217,000 | 8/1980 | Watanabe . |
| 4,248,471 | 3/1981 | LaBounty . |
| 4,376,340 | 3/1983 | Ramun et al. . |
| 4,382,625 | 5/1983 | LaBounty . |
| 4,403,431 | 9/1983 | Ramun et al. . |
| 4,439,921 | 4/1984 | Ramun et al. . |
| 4,512,524 | 4/1985 | Shigimizu ..................... 241/101.7 |
| 4,519,135 | 5/1985 | LaBounty . |
| 4,541,177 | 9/1985 | Hollander . |
| 4,543,719 | 10/1985 | Pardoe . |
| 4,558,515 | 12/1985 | LaBounty . |
| 4,670,983 | 6/1987 | Ramun et al. . |
| 4,686,767 | 8/1987 | Ramun et al. . |
| 4,5367,976 | 8/1985 | Holopainen . |

FOREIGN PATENT DOCUMENTS 2122125 1/1984 United Kingdom .

Primary Examiner—Timothy V. Eley
Attorney, Agent, or Firm—Palmatier & Sjoquist

[57] ABSTRACT

An attachment for the boom structure and hydraulic system of a hydraulic excavator, including a pair of relatively swingable jaws for crushing concrete slabs and the like, each of the jaws having a grid like jaw structure with elongate rigid plates extending outwardly from the pivot structure, there being a multiplicity of tapered tooth like projections on the grid structure of the jaws, the tooth like projections being of various lengths, at least one of the jaws being connected to the hydraulic system to open and close the jaws to apply pressure and fracture concrete structures being gripped and crushed.

23 Claims, 3 Drawing Sheets

CONCRETE CRUSHER

This relates to an attachment for hydraulic excavators for crushing concrete pavement slabs and the like.

BACKGROUND OF THE INVENTION

In rebuilding highways for motor vehicle travel, and in the demolition of structures which are largely made of or incorporate reinforced concrete as structural members, the disposal of large pieces of concrete paving or reinforced concrete structure becomes a significant problem. Many governmental regulations and practical considerations relating to the operation of landfills prohibit the disposal of concrete slabs and large reinforced concrete structures by simply burying them in the landfills. Accordingly, it becomes necessary to dispose of such concrete material in other ways.

Crushing of the concrete is one alternative so that the concrete slabs and structures may be reduced to smaller particle sizes which accommodates the reuse of such concrete as fill and as aggregate base for roadways and the like.

The prior art has not known adequate devices for reducing concrete structures and slabs into particulate in a manner as to facilitate temporary usage in one location and then use later in widely remote locations.

It has been possible in the past to reduce concrete into particles and chunks by use of heavy duty shears, but such shears which are primarily designed for shearing steel and other metallic and wood structures, have sharpened blades and are rather expensive for the purpose of reducing concrete slabs and structures which is thought to be accomplished in other ways.

SUMMARY OF THE INVENTION

A feature of the invention is the provision, in a heavy duty attachment for the boom structure of a hydraulic excavator, of tined jaws confronting and closing on each other and having concrete slab engaging and fracturing teeth faces of the jaw.

Another feature is the provision in such an attachment, of power operated crushing jaws, each with multiple prongs projecting from edges of disaligned jaw plates spaced from each other and swinging edgeways The spaces between the jaw plates are substantially in excess of the thickness of the plates on the other jaw.

Still another feature of the invention is the provision in such an attachment, of relatively swingable concrete crushing jaws with multiply pronged bearing faces in a grating array of plate edges and with shearing blades to sever reinforcing bars and similar noncrushable portions closely associated with the concrete being crushed.

The jaws will be closed onto the opposite surfaces of a concrete slab or frangible article and the teeth will apply localized pressure at diverse places as to cause the concrete to fracture and break into pieces. The longest teeth on prongs at the cuter ends of the jaws will first engage and penetrate the concrete slab and will start the breaking of the slab, and then the other teeth spaced along the jaw faces will engage and break the concrete into smaller pieces. As concrete slabs are being broken and crushed, steel reinforcing bars which are embedded in the concrete, are oftentimes encountered. When breaking of a chunk of concrete from the slab is impeded by interconnecting reinforcing bars, the shear may sever the bar to allow the crushing to proceed with dispatch.

The invention provides the advantage of being able to crush concrete and similar structures through the use of an ordinary piece of equipment generally known as a hydraulic excavator. The attachment may be mounted on the end of the boom structure, oftentimes on the end of the second member known as a dipper stick, as to replace the conventional digging bucket found on most hydraulic excavators. The attachment is relatively cheap and will readily reduce concrete slabs and structures to particulate form. The teeth on the tined jaws, being of various lengths and sizes progressively engage and penetrate the concrete slab being handled so that the power exerted by the jaws may be progressively applied though the various teeth and tined portions of the jaws.

DETAILED DESCRIPTION OF THE PREFERRED EMBODIMENT

Figure 1:
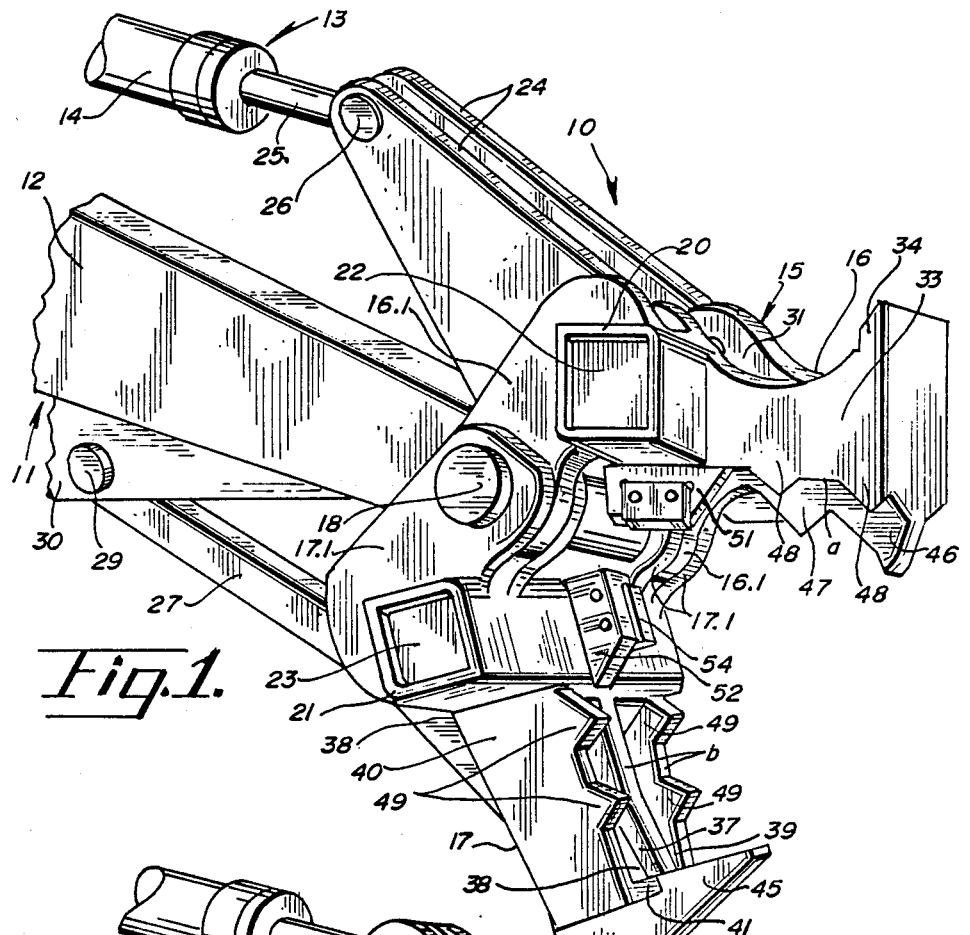
FIG. 1 is a perspective view of the attachment mounted on the end on the boom structure i.e. the dipper stick of a hydraulic excavator.

One form of the invention is illustrated in the drawings and is described herein. The attachment is indicated in general by numeral 10 and is adapted for mounting upon the boom structure 11 of a hydraulic excavator and more specifically on the end of the dipper stick 12 of such a hydraulic excavator. The attachment 10 is also adapted for connection to the hydraulic system 13 of such a mobile machine or hydraulic excavator and particularly as illustrated in FIG. 1, the hydraulic system includes a hydraulic cylinder 14 which is mounted on the boom structure and is normally used in the hydraulic excavator for operating the digging bucket.

The heavy duty attachment 10 includes a steel jaw structure 15 having a pair of steel jaws 16 and 17, each of which is entirely integral and in a one piece fabricated construction wherein all portions are welded together. The jaw 16 is moveable as by swinging and because of its relationship to the dipper stick 12 and hydraulic cylinder 14, is oftentimes referred to as the front jaw or top jaw. The jaw 17 is, in most cases stationary with respect to the dipper stick 12 and is oftentimes referred to as the back jaw or lower jaw.

The two jaws 16 and 17, are pivotally connected together for relative swinging, and to this end, the jaws have interleaving mounting plates 16.1, 17.1 which are apertured and mounted on the ends of a pivot pin 18. The portion of pin 18 intermediate the ends thereof extends through the end portion 19 of the dipper stick 12 to provide a means for mounting the jaw structure 15 on the boom structure 11. The rigid mounting plates 16.1, 17.1 of the jaws 16 and 17 are affixed as by welding to jaw box frames or beams 20, 21 respectively which extend transversely across the jaws and rigidify the structures of the jaws 16, 17.

The elongate box beams 20, 21 have rigid transverse plates 22, 23 welded therein to minimize a possibility of warpage or other defamation of these rigid box beams 20.

Additional means are provided on the jaws 16, 17 for controlling the orientation thereof and swinging, and such means includes a pair of bracket plates 24 affixed on the swingable front jaw 16 as by welding to the box beam 20 and spaced from each other to receive the ram 25 of the hydraulic cylinder 14 therebetween. A pivot pin 26 connects the ram 25 to the bracket plates 24 so that as the hydraulic cylinder extends the ram, the jaw 16 will swing relative to the dipper stick 12 and relative to the lower jaw 17. The lower jaw is provided with a rigid brace 27 affixed as by a connector pin 28 to the lower jaw 17 and connected as by a connector pin 29 to a mounting or bracket structure 30 which is affixed as by welding to the dipper stick 12. In the ordinary course of operating the attachment 10, the lower jaw 17 is held stationary by the brace 27. However, in some instances, the brace 27 may be replaced by an extensible connection 27.1 illustrated in phantom lines in FIG. 6 and may be in the form of a hydraulic cylinder so that the orientation of the lower jaw 17 may be adjustable.

Figure 2:
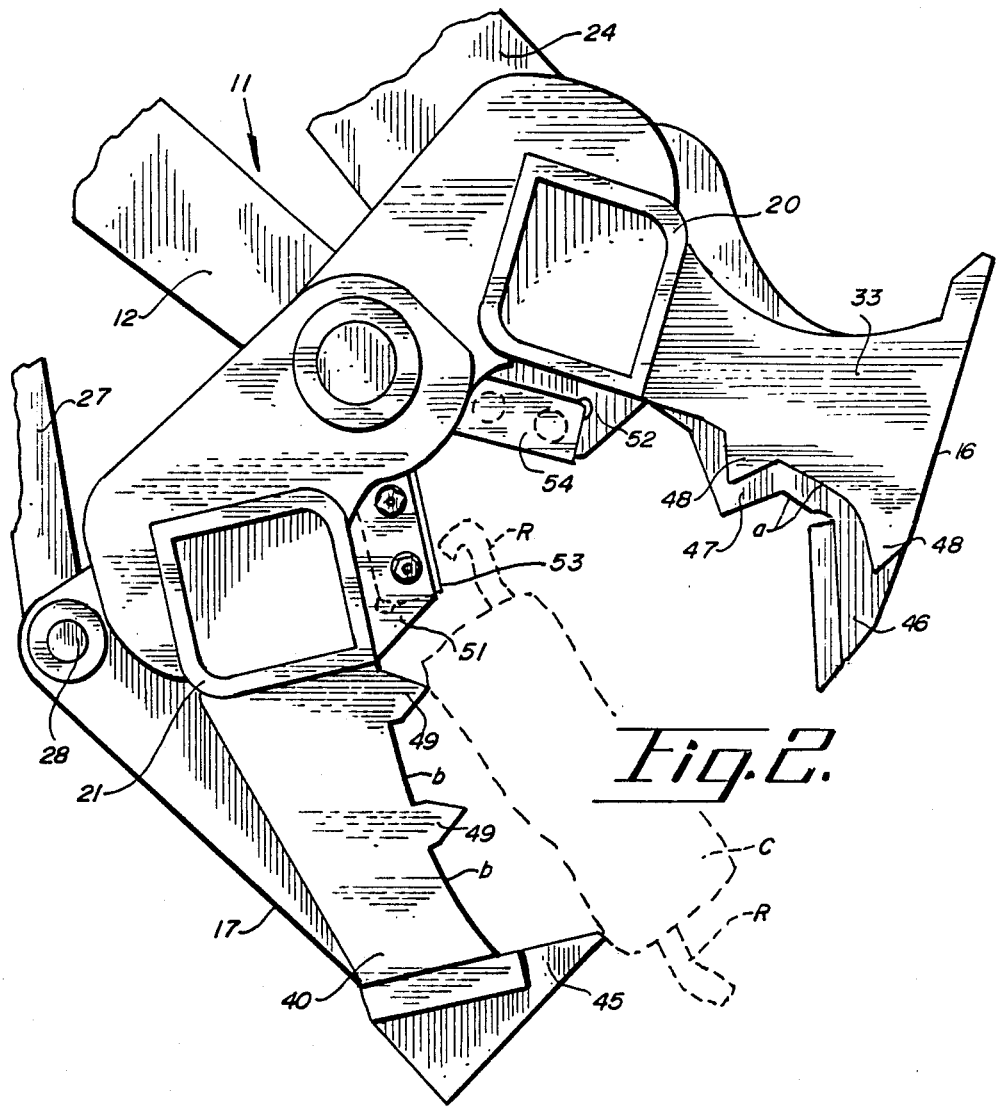
FIG. 2 is a side elevation view of the attachment in open condition.
Figure 5:
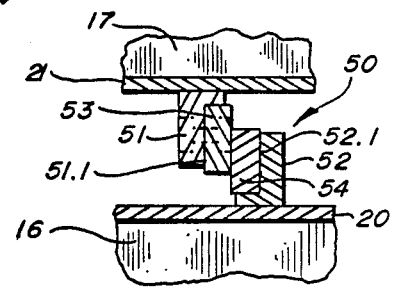
FIG. 5 is an enlarged detail section view taken approximately at 5—5 of FIG. 3.
Figure 3:
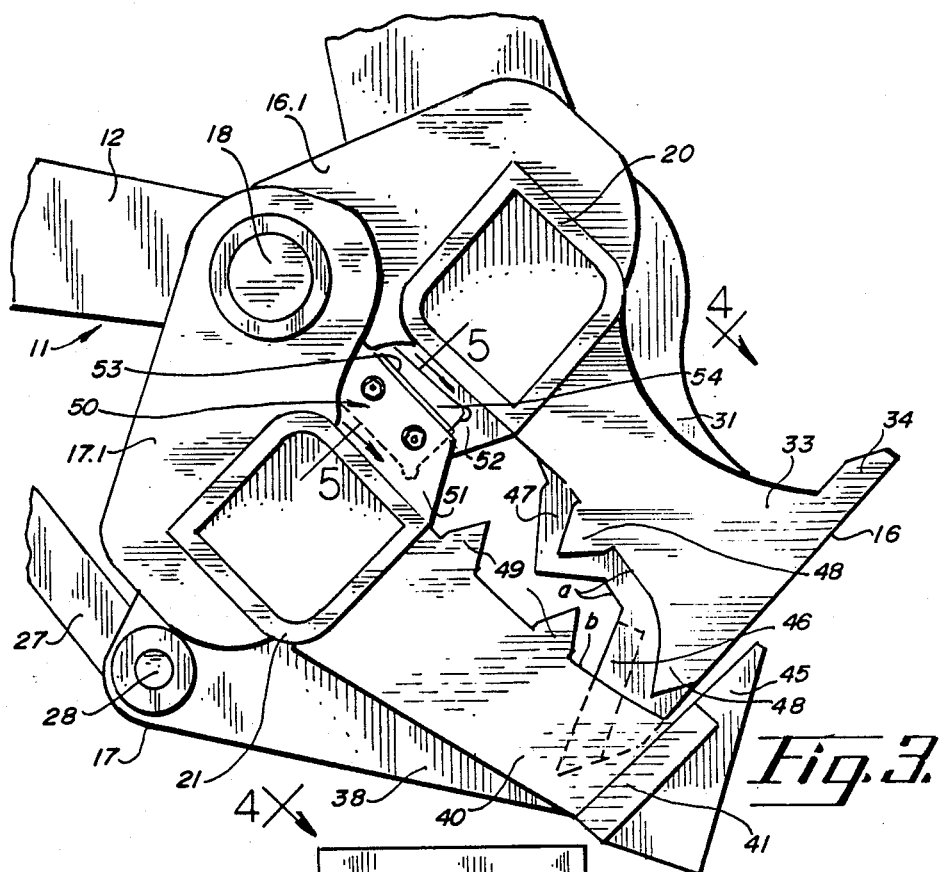
FIG. 3 is a side elevation view of the attachment in closed condition.

The two jaws 16 and 17 are oriented to confront each other and to grip and apply pressure to a concrete article which may have the approximate shape of article C illustrated in phantom lines in FIG. 2. Such a concrete article may be a part of a slab of concrete which has originated with a concrete roadway or highway, and may have lengths of protruding reinforcing rods R extending therefrom.

Both of the jaws 16 and 17 are generally grid shaped and are formed of a multiplicity of rigid steel plate-like grid elements 31–34 and 37–41 extending transversely of each other and affixed to each other as by welding. The edge surfaces a, b of the grid elements confront the opposite jaw and define the jaw faces. More specifically, the swinging front jaw 16 has three plate-like tines or grid elements 31, 32, and 33, all of which have inner end portions affixed as by welding to the box beam 20 and have their outer end portions affixed as by welding to a cross plate 34. It will be recognized that the grid elements or plate-like tines 31, 32, and 33 are widely spaced from each other and in confronting relation with each other so that open areas 35, 36 exist between these plate-like tines or grid elements which make up the grid of the top jaw 16. The cross plate 34 protrudes slightly to the rear of the jaw 16, facilitating fastening a cable or chain thereon for lifting articles as may be required.

The grid shaped jaw 17 also has a multiplicity of plate-like tines or grid elements 37, 38, 39, and 40 which are widely spaced from each other and which have their inner end portions affixed as by welding to the box frame 21 and have their outer ends affixed by welding to a cross plate 41 which is also a part of the grid of jaw 17. The wide spacing between the grid elements 37, 38, 39, and 40 provides open and unobstructed areas 42, 43, and 44 to permit particles of the crushed material from the slab C to pass therethrough.

The two central plate-like tines 37, 38 mount the pin 28 which connects the brace 27 to the jaw 17 as to hold the jaw 17 stationary.

It will be recognized that the plate-like tines 37, 38, 39, and 40 on the stationary jaw 17 are somewhat longer than the plate-like tines or grid elements 31, 32, 33 on jaw 16. It will also be noted that the cross plate 41 on jaw 17 is spaced from the axis of pivot 18 further than is the cross plate 34 on jaw 16 so that the two cross plates 34 and 41 are disaligned with respect to each other as the jaws 16 and 17 are swung into close proximity with each other as to grip and crush an article C.

Further, it will be observed that the several plate-like tines or grid elements on the removable jaw 16 are disaligned with the plate-like tines or grid elements on the stationary jaw 17 so that as the jaws are closed, the edges of the plate-like tines or grid elements on the moveable jaw do not directly confront the edges of the plate-like tines or grid elements on the stationary jaw, but on the other hand, all of the plate-like tines or grid elements on both jaws confront open spaces adjacent the other jaw and between the plate-like tines or grid elements thereof.

It will be further noted that all of the open spaces 35, 36, 42, 43, and 44 are wider than the opposite plate-like tines which confront these spaces so that all of the tines remain in spaced relation with the tines on the other jaw as the jaws are swung close to each other for crushing such an article C.

Both of the jaws 16 and 17 have pressure applying and localizing means confronting and tapering convergently toward the opposite jaws. Each means includes lugs or teeth 45, 46, 47, 48 and 49.

Figure 4:
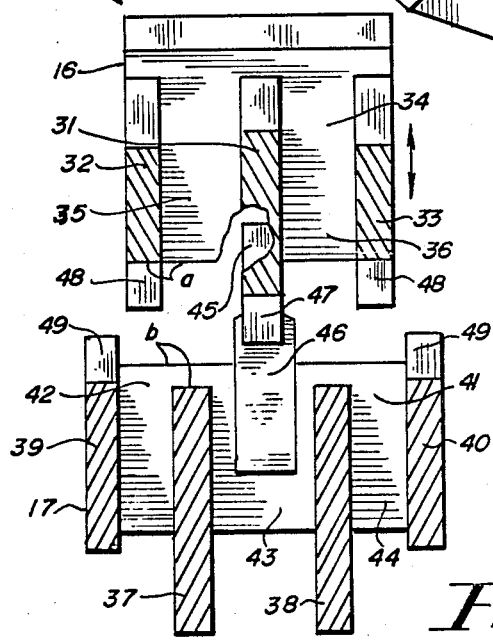
FIG. 4 is a detail section view taken approximately at 4—4 of FIG. 3.

The jaw 17 has the elongate tapered tooth or lug 45 affixed on the cross plate 41 as by welding and protruding toward the jaw 16 and into overlapping relation with the outer end portion of the jaw 16 and into traversing relation with the cross plate 34 of jaw 16. In FIG. 4, a portion of jaw 16 is broken away so as to see the tooth 45 in its relation to the cross plate 34.

The jaw 16 also carries the elongate tapered lug or tooth 46 which is formed on the central plate-like tine or grid element 31 and is aligned with the open space 43 in jaw 17. The tooth 46 has a replaceable wear plate forming its outer most point and may be replaceable as needed due to wear in use of the attachment 10. It will be recognized in FIG. 4 that the tooth 46 on jaw 16 is somewhat wider or broader than the plate-like tine 31 and is also broader than the opposite tooth 45 on the other jaw.

The center plate-like tine 31 on moveable jaw 16 also has the single large lug or tapered tooth 47 on its front edge forming a portion of the jaw face and protruding toward the jaw 17 when the jaws are in the closed position.

The additional tapered lugs or teeth 48 are formed on the front edges of the plate-like tines or grid elements 32, 33 which are the outer side plate-like tines or grid elements of jaw 16. These teeth 48 protrude toward the open spaces 42, 41 in jaw 17 but remain spaced from the plate-like tines or grid elements of the jaw 17.

The jaw 17 also carries the multiplicity of tapered lugs or teeth 49 on the front edges of the outermost plate-like tines 39, 40 of which teeth 49 protrude toward the jaw 16 as the jaws are swung toward closed position. The teeth 49 are disaligned with the teeth 48 on the opposite jaw, and the teeth 49 remain transversely outwardly of the plate-like tines or grid elements 32, 33 of the moveable jaw.

The size and length of the several tapered lugs or teeth is significant, and it will be noted that a differential exists between the lengths of the teeth. The lugs or teeth 45 and 46 are the longest teeth and in most instances will first engage the slab or article C to be crushed. The teeth 48 and 49 are the shortest and smallest teeth; the tooth 47 on moveable jaw 16 is of intermediate size between the sizes of teeth 48, 49 and the larger teeth 45, 46. Because the teeth are of various sizes and lengths, they will not all engage the article C simultaneously, but will engage the article in sequence so that each tooth will begin penetrating and fracturing the article without sharing significant power from the mobile machine with the other teeth as the crushing begins.

The jaw structure 15 also incorporates a shear which is indicated in general by numeral 50. The shear 50 includes a pair of mounting plates 51 and 52 affixed as by welding to the box frames 21, 20 respectively, and in a position as to swing across each other into overlapping and facing relation as the jaws 16 and 17 are closed. Each of the mounting plates 51, 52 has a recess 51.1, 52.1 for the purpose of mounting shear blades 53, 54 in shearing relation with each other. The shear blades 53, 54 are retained in the mounting plates as by fasteners such as bolts. The shear 50 is useful for cutting steel or reinforcing rods R as illustrated in FIG. 2 and other steel structures encountered in crushing reinforced concrete.

Figure 6:
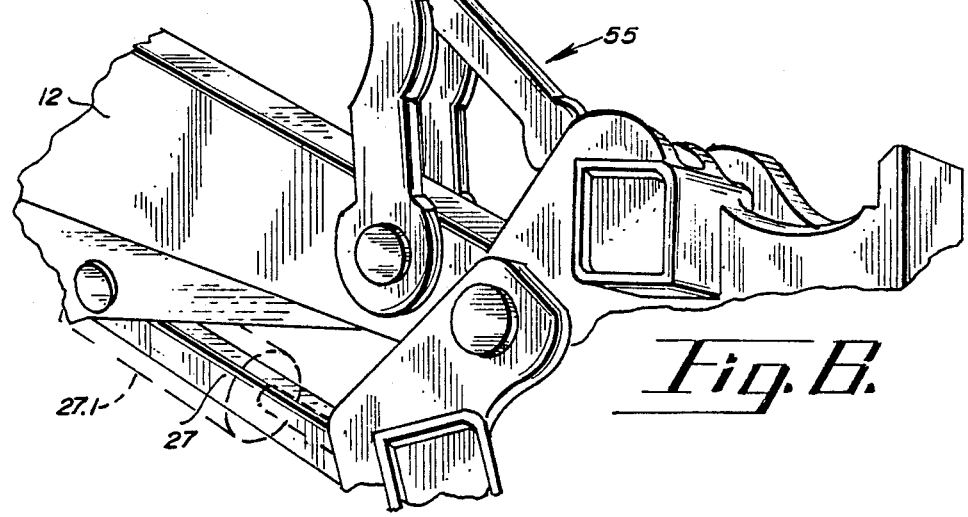
FIG. 6 is a perspective view showing an alternative form of apparatus for attachment between the moveable jaw and the hydraulic ram of the excavator.

The brackets 24 may changes in shape, depending upon the particular dimensions and proportions existing in the boom structure 11 and hydraulic system 13 of the mobile machine. In some instances the bracket members 24 will be long and tapered as illustrated and in other instances the bracket members will be somewhat shorter and may be differently oriented. All of this simply is to match the attachment to the particular mobile machine on which the attachment is being mounted. In other instances, as illustrated in FIG. 6, a swinging linkage indicated by the numeral 55 may be used in order to accommodate the design of a particular mobile machine. The linkage illustrated connected to the ram of a hydraulic cylinder and to the swingable jaw 16, and the linkage is also swingably mounted on the dipper stick 12 of the boom structure.

The attachment 10 may be operated as to open the jaws for lifting and grasping and applying pressure to the article C as illustrated in FIG. 2. As the jaws are closed relative to each other, the two elongate lugs or tapered teeth 45, 46 will first engage the article as to commence penetration of it and cause initial fracturing. As the jaws continue to close, by moving the jaw 16 toward the jaw 17, the other teeth will progressively and sequentially engage the surfaces of the article for penetrating and fracturing the material in it. This crushing tool may be advantageously used in reducing concrete slabs to particle size or chunks so that the chunks may be readily distributed and used as aggregate in a road bed or other suitable site.

Although the sizes of the plate-like tines and cross plates in the attachment may vary according to the overall size of the attachment and with the nature of the work to be done, it has been found that it is desirable to use steel plates integrally welded together to form the grids of the jaws with sheet stock which is approximately two inches thick, both in the plate-like tines or grid elements and in the cross plates. The plate-like tines or grid elements of the moveable jaw 16 may extend approximately eighteen inches outwardly of the box frame 20 to the cross plate 34, and the cross plate may have a width so as to establish the dimension between the outside surfaces of the plate-like tines 32, 33 of approximately 15 inches.

The stationary jaw 17 is somewhat larger and may extend outwardly from the box frame 21 approximately twenty one inches to the cross plate 41 which may have a width of approximately twenty inches to traverse all of the plate-like tines or grid elements as illustrated in FIG. 4.

It will be seen that the invention provides a new and improved concrete crusher which may be used to lift and grasp articles of reinforced concrete and to crush them into particulate sizes so that they may be handled by other types of equipment and buried in landfills or used as aggregate in construction sites.

I claim:

1. A heavy duty attachment for crushing articles of frangible rubble and building materials such as concrete and for connection to the boom structure and hydraulic system of a mobile machine such as a hydraulic excavator, comprising a jaw structure including first and second relatively swingable jaws pivotally connected to each other, each of the jaws having an inner end portion adjacent the pivotal connection and also having an outer end portion, means for mounting and connecting the jaw structure to the boom structure and hydraulic system of such a mobile machine in order to have at least one jaw and to open and close the jaws relative to each other and to grip and apply pressure onto such an article to be crushed, and said first jaw having a rigid grid made of elongate rigid grid elements, certain of said grid elements extending transversely of each other and affixed together, certain of the grid elements being widely spaced from each other to define open areas therebetween and to permit crushed material from the articles to pass through the jaw.

2. The heavy duty attachment according to claim 1 and one of said grid elements being disposed adjacent said outer end portion of the first jaw and traversing other of said grid elements and being affixed thereto.

3. A heavy duty attachment according to claim 2 and the second jaw having a rigid tooth thereon and protruding toward the first jaw and one of said open areas thereof.

4. A heavy duty attachment according to claim 1 and said second jaw having pressure applying teeth confronting and protruding toward the grid of the first jaw to fracture such an article as pressure is applied thereto by the jaws.

5. A heavy duty attachment according to claim 3, wherein certain of said teeth on the second jaw are disaligned with the grid elements and are in confronting relation with certain open areas between grid elements.

6. A heavy duty attachment according to claim 3, wherein said grid includes rigid plate shaped grid elements oriented transversely of the axis of swinging and in widely spaced and confronting relation to each other and allowing particles of the crushed article to pass therebetween.

7. A heavy duty attachment for crushing articles of frangible rubble and building materials such as concrete and for connection to the boom structure and hydraulic system of a mobile machine such as a hydraulic excavator, comprising a jaw structure including first and second relatively swingable jaws pivotally connected to each other, each of the jaws having an inner end portion adjacent the pivotal connection and also having an outer end portion, means for mounting and connecting the jaw structure to the boom structure and hydraulic system of such a mobile machine in order to move at least one jaw and to open and close the jaws relative to each other and to grip and apply pressure onto such an article to be crushed, and said first jaw having a rigid grid made of elongate rigid grid elements, certain of said grid elements extending transversely of each other and affixed together, certain of the grid elements being widely spaced from each other to define open areas therebetween and to permit crushed material from the articles to pass through the jaw, said grid having a plurality of teeth on certain of the grid elements, the teeth protruding toward the second jaw.

8. A heavy duty attachment according to claim 7, and including a plurality of teeth on the second jaw and protruding toward the grid of the first jaw.

9. A heavy duty attachment according to claim 8, wherein said teeth on the second jaw are offset from and in disalignment with the teeth on the grid of the first jaw.

10. A heavy duty attachment according to claim 6, wherein the teeth on the second jaw vary in size relative to each other.

11. A heavy duty attachment according to claim 7 wherein the teeth on the grid are of varying size relative to each other.

12. A heavy duty attachment according to claim 7 wherein the teeth on the grid are of varying shape relative to each other.

13. A heavy duty attachment for crushing articles of frangible rubble and building materials such as concrete and for connection to the boom structure and hydraulic system of a mobile machine such as a hydraulic excavator, comprising a jaw structure including first and second relatively swingable jaws pivotally connected to each other, each of the jaws having an inner end portion adjacent the pivotal connection and also having an outer end portion, means for mounting and connecting the jaw structure to the boom structure and hydraulic system of such a mobile machine in order to move at least one jaw and to open and close the jaws relative to each other and to grip and apply pressure onto such an article to be crushed, each of said jaws having a rigid grid made of elongate rigid grid elements, said grids being opposite each other and in confronting relation with each other, certain of said grid elements in each grid extending transversely of each other and affixed together, and certain of the grid elements being widely spaced from each other to define open areas therebetween and to permit crushed material from the articles to pass through the jaw.

14. A heavy duty attachment according to claim 9, wherein certain of said grid elements of each grid are disaligned with grid elements on the other jaw to move into confronting relation with the open areas of the opposite grid.

15. A heavy duty attachment according to claim 13, and the open areas of both jaws being wider than the thickness of the grid elements of the opposite grid.

16. A heavy duty attachment according to claim 13, wherein the grids of both of the jaws have rigid teeth confronting and protruding toward the opposite jaw.

17. A heavy duty attachment according to claim 16, wherein the teeth on the first jaw being spaced from the pivotal connection differently than the teeth on the second jaw.

18. A heavy duty attachment according to claim 12, wherein said teeth are affixed on the grid elements of each of the grids, certain of said grid elements and the teeth thereon being disaligned with the grid elements and teeth on the other grid.

19. A heavy duty attachment according to claim 11 and the jaw structure including a shear operated by opening and closing of the jaws.

20. A heavy duty attachment according to claim 16 and including a pair of elongate rigid teeth one on each jaw adjacent the outer end portion thereof, said elongate teeth being positioned to overlap and bypass each other while the grids of the jaws remain in spaced relation to each other.

21. A heavy duty attachment for crushing articles of frangible rubble and building materials such as concrete and for connection to the boom structure and hydraulic system of a mobile machine such as a hydraulic excavator, comprising a jaw structure including a pair of relatively swingable jaws pivotally connected to each other, each of the jaws having an inner end portion adjacent the pivotal connection and also having an outer end portion, means for mounting and connecting the jaw structure to the boom structure and hydraulic system of such a mobile machine in order to move at least one jaw and to open and close the jaws relative to each other and to grip and apply pressure onto such an article t be crushed, and each of the jaws having an array of rigid teeth protruding toward the other jaw for engaging and penetrating the article to be crushed, certain of said teeth on each jaw being disaligned with the teeth of the jaw as the jaws are closed.

22. A heavy duty attachment according to claim 21, wherein certain of said teeth of one jaw being disaligned with and offset from adjacent teeth on the other jaw as the jaws are closed.

23. A heavy duty attachment for crushing articles of frangible rubble and building materials such as concrete and for connection to the boom structure and hydraulic system of a mobile machine such as a hydraulic excavator, comprising a jaw structure including a pair of relatively swingable jaws pivotally connected to each other, each of the jaws having an inner end portion adjacent the pivotal connection and also having an outer end portion, means for mounting and connecting the jaw structure to the boom structure and hydraulic system of such a mobile machine in order to move at least one jaw and to open and close the jaws relative to each other and to grip and apply pressure onto such an article to be crushed, each of the jaws having a rigid grid made of elongate rigid plate-shaped grid elements, certain of said grid elements extending from the inner end portion of the jaw and toward the outer end portion thereof and other of the grid elements extending transversely and being affixed to said first mentioned grid elements, there being open areas between certain of the grid elements to permit crushed material from the articles to pass through the jaws, a plurality of teeth on the grid elements and spaced from each other, the grid elements on the two jaws and the teeth on the grid elements being arranged in disalignment with respect to each other as to confront open areas between the grid elements to fracture and break the article as the jaws are closed, each of the jaws having an elongate breaking tooth at its outer end portion and protruding toward the other jaw as the jaws are closed, said breaking teeth being arranged to pass by each other into overlapping relation and one of said breaking piece being insertable into an open area between the open elements of the opposite jaw.

* * * * *

REEXAMINATION CERTIFICATE (2436th)
United States Patent [19]
LaBounty

[11] B1 4,838,493
[45] Certificate Issued Dec. 6, 1994

[54] CONCRETE CRUSHER

[75] Inventor: Kenneth R. LaBounty, Two Harbors, Minn.

[73] Assignee: LaBounty Manufacturing, Inc., Two Harbors, Minn.

Reexamination Request:
No. 90/003,091, Jun. 9, 1993

Reexamination Certificate for:
Patent No.: 4,838,493
Issued: Jun. 13, 1989
Appl. No.: 205,422
Filed: Jun. 10, 1988

Certificate of Correction issued Jun. 4, 1994.

[51] Int. Cl.$^5$ .............................................. B02C 1/06
[52] U.S. Cl. .................................. 241/101.7; 241/66; 225/23; 225/103; 414/734
[58] Field of Search ............... 225/23, 103; 241/101.7, 241/263-269, 283; 299/14, 15, 69, 70; 414/729, 734, 735

[56] References Cited
U.S. PATENT DOCUMENTS
4,776,524 10/1988 Sakato ............................. 241/101.7

FOREIGN PATENT DOCUMENTS
59-187976 10/1984 Japan.

*Primary Examiner*—Timothy V. Eley

[57] ABSTRACT

An attachment for the boom structure and hydraulic system of a hydraulic excavator, including a pair of relatively swingable jaws for crushing concrete slabs and the like, each of the jaws having a grid like jaw structure with elongate rigid plates extending outwardly from the pivot structure, there being a multiplicity of tapered tooth like projections on the grid structure of the jaws, the tooth like projections being of various lengths, at least one of the jaws being connected to the hydraulic system to open and close the jaws to apply pressure and fracture concrete structures being gripped and crushed.

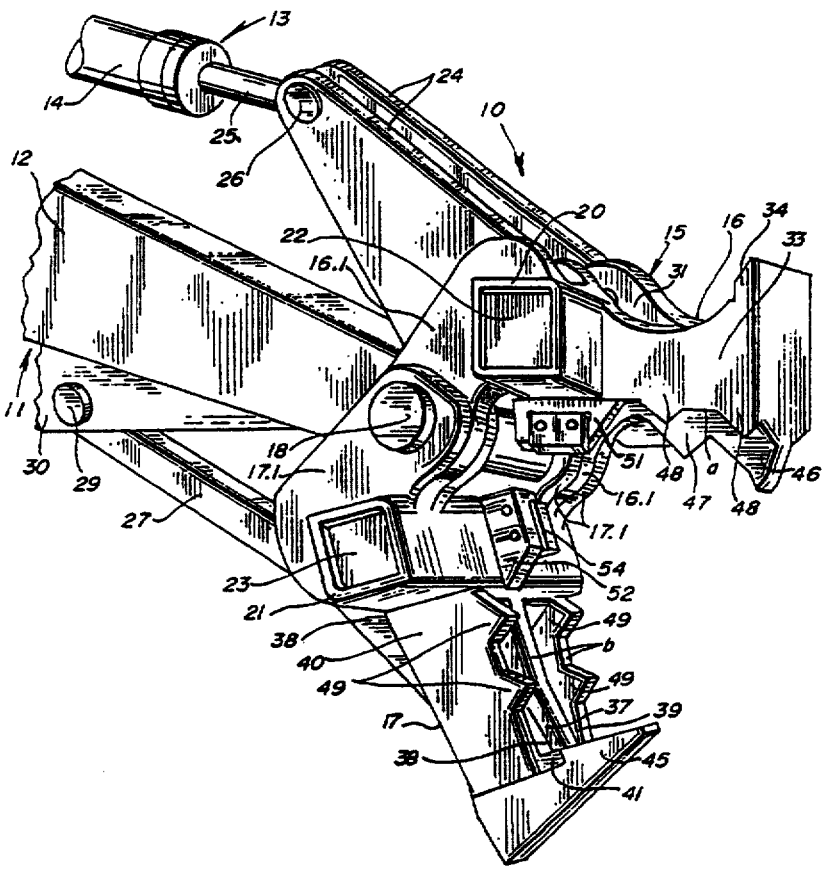

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13, 15–17, 20 and 23 is confirmed.

Claims 1, 7–9, 11, 12, 21 and 22 are cancelled.

Claims 2, 4, 14, 18 and 19 are determined to be patentable as amended.

Claims 3, 5, 6 and 10, dependent on an amended claim, are determined to be patentable.

2. The heavy duty attachment according to claim [1 and] *13 wherein* one of said grid elements [being] *is* disposed adjacent said outer end portion of the first jaw and [traversing] *traverses* other of said grid elements and *is* being affixed thereto.

4. A heavy duty attachment according to claim [1 and] *13 wherein* said second jaw [having] *has* pressure applying teeth confronting and protruding toward the grid of the first jaw to fracture such an article as pressure is applied thereto by the jaws.

14. A heavy duty attachment according to claim [9] *13*, wherein certain of said grid elements of each grid are disaligned with grid elements on the other jaw to move into confronting relation with the open areas of the opposite grid.

18. A heavy duty attachment according to claim [12] *13*, wherein said teeth are affixed on the grid elements of each of the grids, certain of said grid elements and the teeth thereon being disaligned with the grid elements and teeth on the other grid.

19. A heavy duty attachment according to claim [11 and] *13 wherein* the jaw structure [including] *includes* a shear operated by opening and closing of the jaws.

* * * * *